Figure 1:
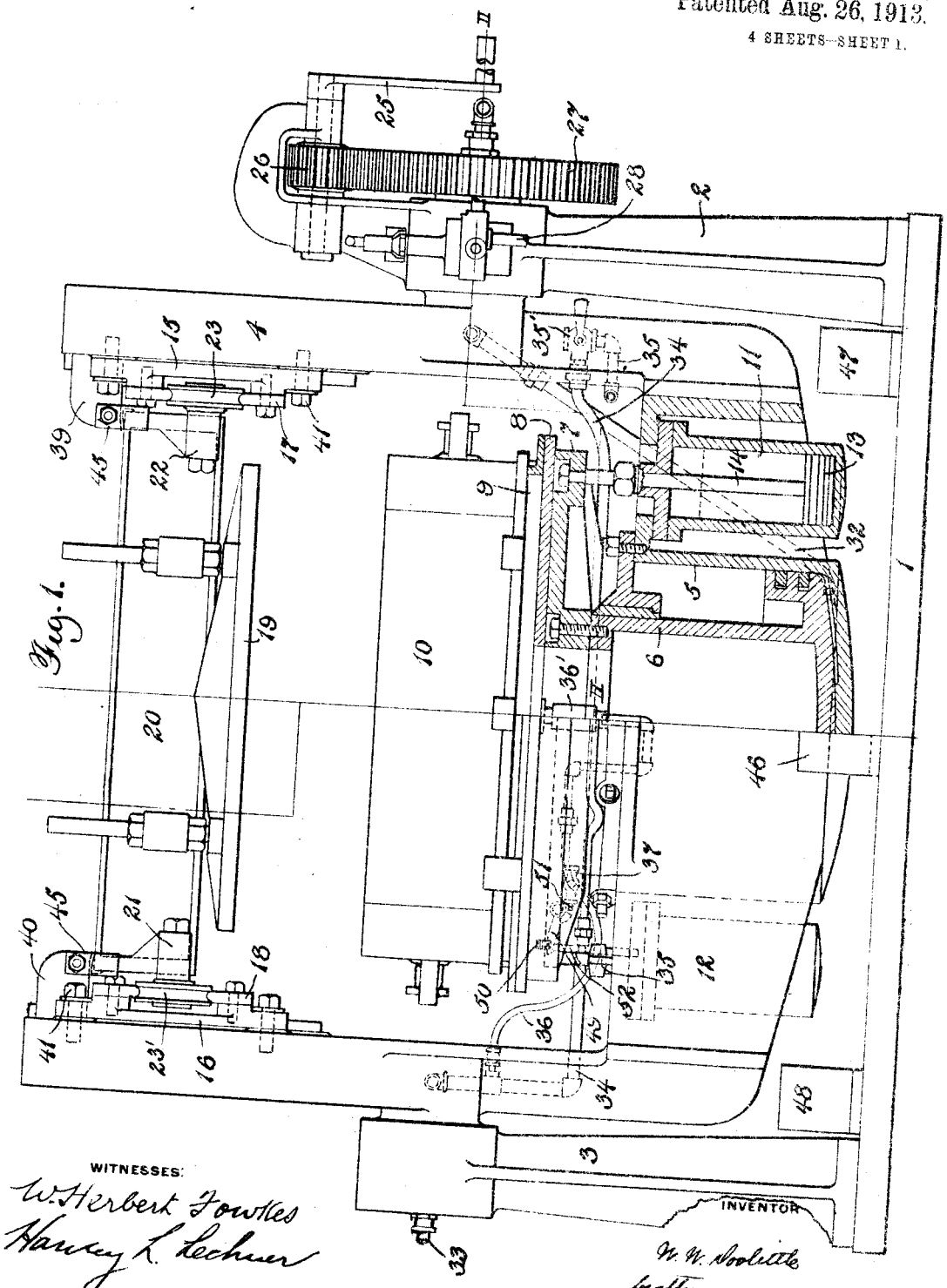

W. W. DOOLITTLE.
MOLDING MACHINE.
APPLICATION FILED MAR. 11, 1911.

1,071,402.

Patented Aug. 26, 1913.
4 SHEETS—SHEET 1.

WITNESSES:
W. Herbert Fowkes
Harvey L. Lechner

INVENTOR
W. W. Doolittle
by atty
Paul Synnestvedt

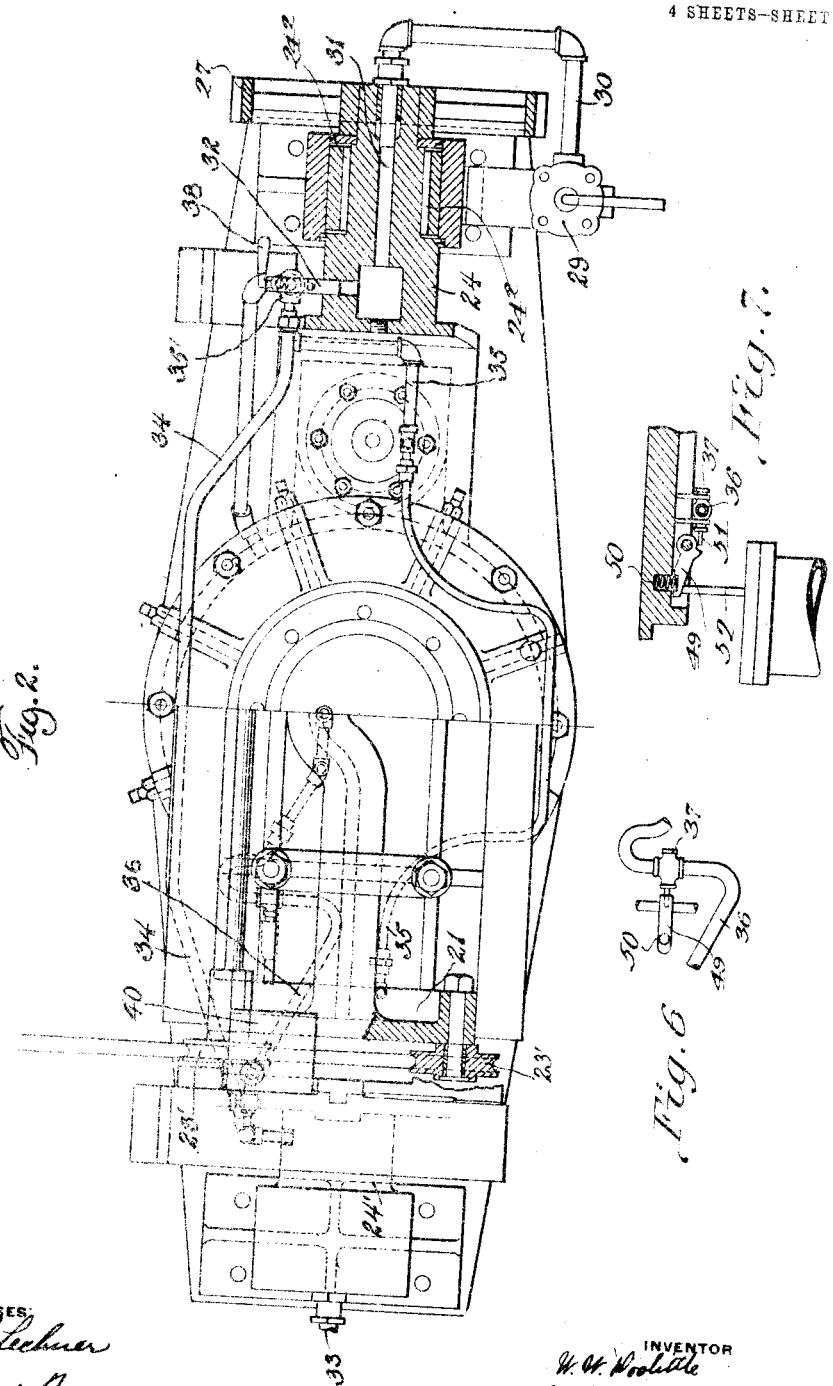

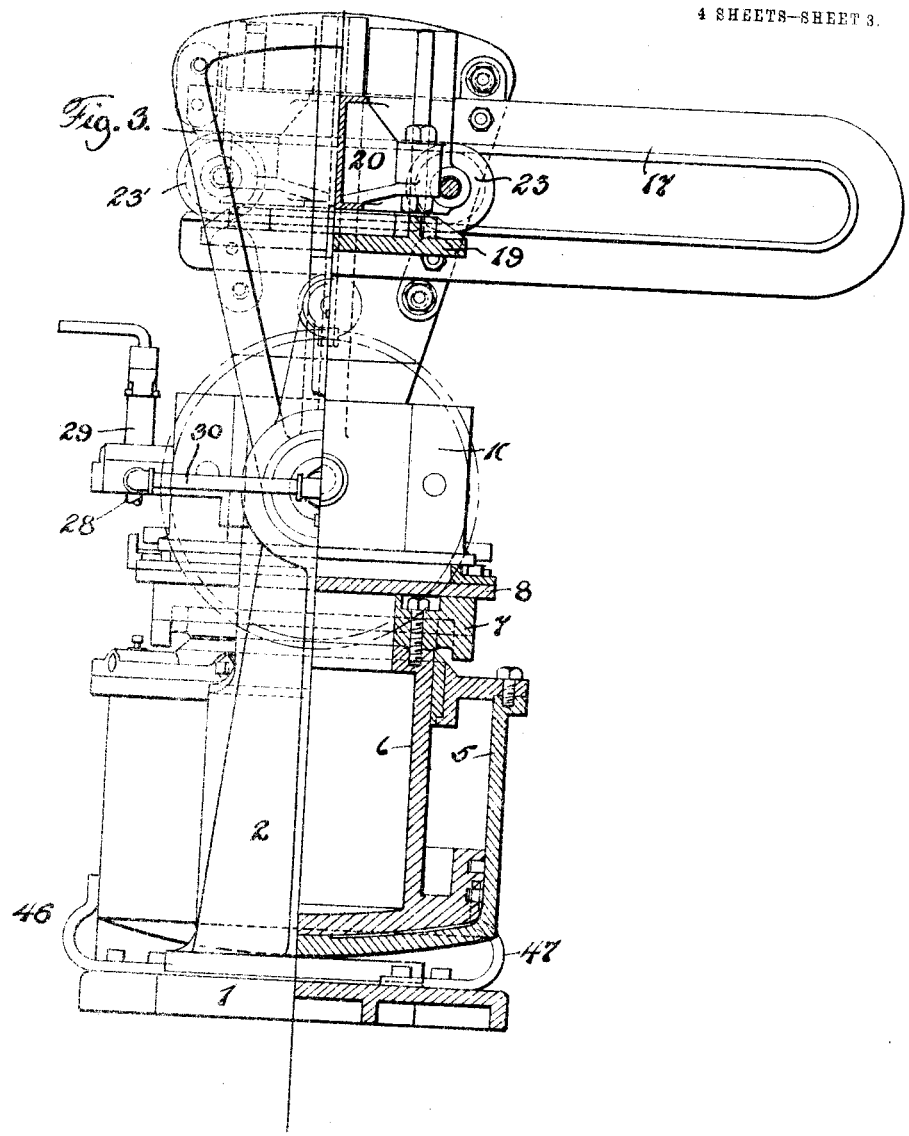

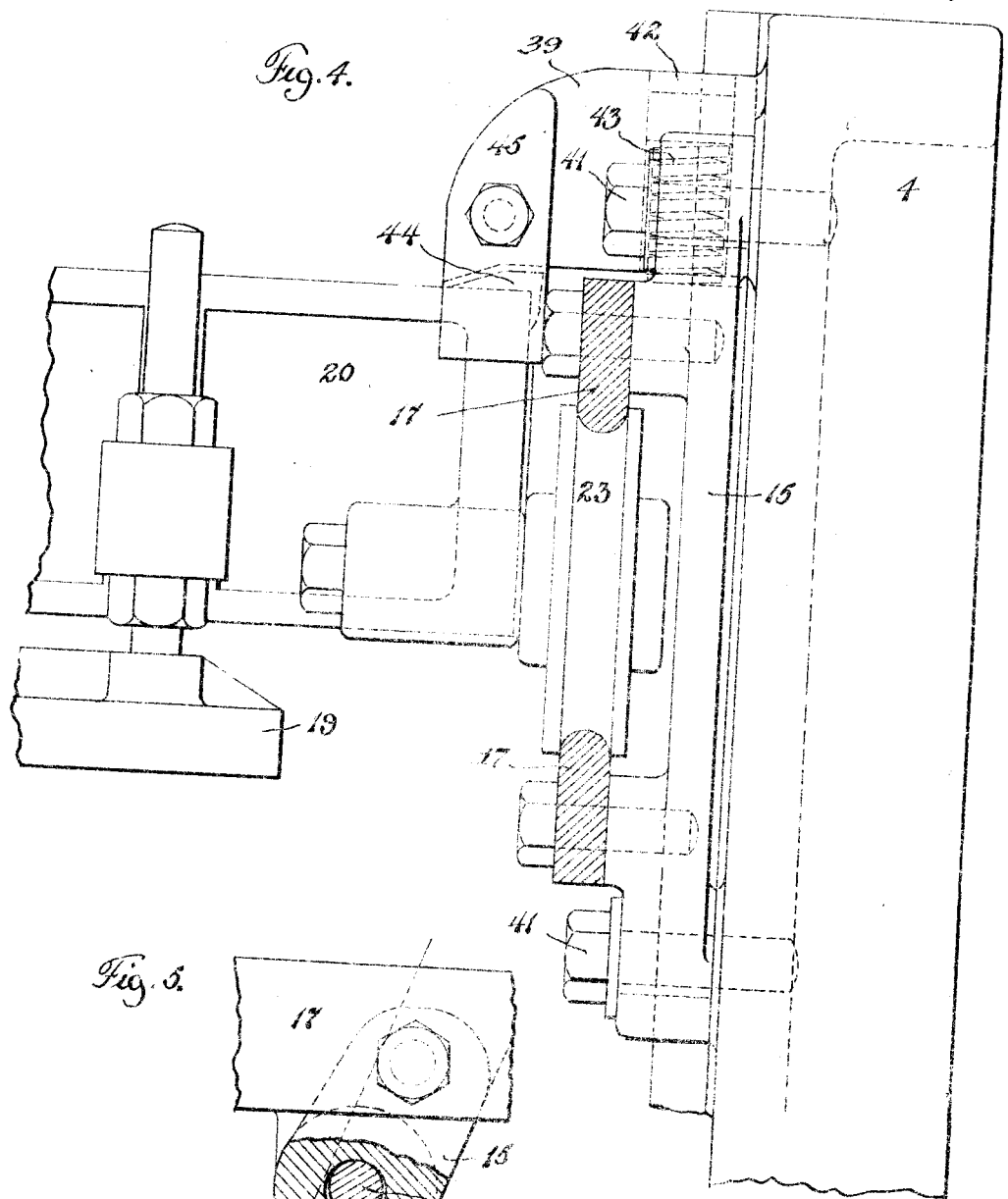

UNITED STATES PATENT OFFICE.

WILLIAM W. DOOLITTLE, OF CHICAGO, ILLINOIS, ASSIGNOR TO CRANE COMPANY, OF CHICAGO, ILLINOIS, A CORPORATION OF ILLINOIS.

MOLDING-MACHINE.

1,071,402.   Specification of Letters Patent.   Patented Aug. 26, 1913.

Application filed March 11, 1911. Serial No. 613,820.

*To all whom it may concern:*

Be it known that I, WILLIAM W. DOOLITTLE, a citizen of the United States, residing at Chicago, in the county of Cook, and in the State of Illinois, have invented certain new and useful Improvements in Molding-Machines, of which the following is a specification.

My invention has reference to molding machines and particularly to roll-over molding machines, and it has for its primary objects the provision of an improved roll-over molding machine wherein the flask may be readily placed in position and the mold, when completed, easily removed; the provision of an improved roll-over molding machine wherein the platen and its supporting mechanism may be retracted from the center of the machine to facilitate the handling of the mold flask; the provision of an improved roll-over molding machine of the character just specified wherein stress on the moving parts is reduced to a minimum, and greater ease of operation secured; and in general the provision of an improved roll-over molding machine of simple construction which is quick and effective in operation, whereby the handling of the mold parts is greatly facilitated and the cost of production lessened. These together with such other objects as may hereinafter appear, or are incidental to my invention, I attain by means of a construction illustrated in preferred form in accompanying drawings, wherein—

Figure 1 is a partial side elevation and section of a molding machine embodying my invention. Fig. 2 is a partial plan and section of Fig. 1, the section being taken along the line II—II of Fig. 1, Fig. 3 is a partial end elevation and section of Fig. 2, the section being on the center line of Fig. 2, Figs. 4 and 5 are views of a detail of my invention. Fig. 6 is a plan view, and Fig. 7 is a side elevation, partially in section, of the mechanism for controlling the admission of fluid pressure to the rappers.

One of the chief objects of my invention is to provide a molding machine wherein the handling of the flask and of the mold, when completed, is greatly facilitated, and greater ease and quickness of operation secured, thus lessening the cost of production.

To this end I have provided a base plate 1 on which are mounted bearing brackets 2 and 3 into which is trunnioned a framework 4 which supports the parts of the molding machine proper. Referring to Fig. 1 of the drawings it will be seen that the frame-work 4 carries a main-cylinder 5 in which is mounted a piston 6, carrying a press plate 7 to which is secured a rapper plate 8. The pattern plate of the machine and a frame 9 for the flask are supported on the rapper plate in the usual manner, and a mold flask 10 is indicated in position over the pattern plate. Adjacent the main cylinder 5 and bolted to the frame work 4 are two supplementary cylinders 11 and 12 in which are mounted pistons 13, the piston stems 14 of which are secured to the ends of the press plate 7 in the manner indicated in Fig. 1. The purpose of these supplementary cylinders will hereinafter appear. On either side of the top portions of the frame 4 are secured plates 15 and 16 to which are bolted the tracks 17 and 18 extending to one side of the center line of the machine. The platen 19 is adjustably carried by the usual strain bar 20 which is provided at its ends with brackets 21 and 22, carrying the sets of wheels 23 and 23' engaging the tracks 17 and 18.

Referring particularly to Fig. 2 it will be seen that the trunnions, or axes 24 and 24' of the machine have roller bearings $24^2$ in the bearing brackets. The machine can be inverted or turned either by hand or by means of the handle 25 and gears 26 and 27, the latter of which is secured to the trunnion 24.

Referring now to the means for supplying pressure to operate the cylinders and the air rapper, it will be seen that I have provided a supply pipe 28 leading to a source of air pressure. The supply is controlled by the valve 29, mounted on the bearing bracket 2. Leading from the valve 29 to the trunnion 24 is a pipe 30. The trunnion is provided with a passage 31 from which leads a pipe 32, extending to the bottom of the cylinder 5 (see Fig. 1). The trunnion 24' likewise is provided with a supply pipe 33 which opens into a passage from which extends the pipe 34. A pipe 35 leading to the supplementary cylinders 11 and 12 is connected to the pipe 34 by means of the three-way cock 35'. From the left hand end of the branch 34 leads a pipe 36 which supplies an air rapper 36' which is mounted on the under side of the rapper plate 8 in the usual manner. Referring to Fig. 1 it will be seen that the pipe 36 is provided with a valve 37 for controlling the flow of the pressure to the rapper, the operation of which will be hereinafter set forth.

The operation of the device is as follows: When it is desired to place the flask 10 in position over the pattern plate and frame 9 the strain bar 20, which carries the platen 19 is retracted or rolled along the tracks 17 and 18, thus giving free access to the machine. When the flask is in position the strain bar is rolled back until the platen centers in position over the flask. Air pressure is then admitted to the main cylinder 5 which raises the piston 6, presses the flask 10 against the platen 19 in the usual manner to pack the sand in the flask and form the mold. During this pressing operation the pistons 13 are moved to the position indicated in dotted lines in Fig. 1. When the mold is completed the machine is inverted and the flask 10 is then carried by the platen 19. After the pattern has been rapped to free it from the mold, pressure is admitted to the supplementary cylinders 11 and 12, through the branch pipe 35 controlled by the cock 35'. This raises the pistons 13 and stems 14, thereby lifting the press plate, rapper plate, pattern plate and associated parts from the flask, it being understood that the pressure in the cylinder 5 is exhausted to permit of such operation. The platen and the flask now supported thereon are retracted or pushed back from the machine along the tracks 17 and 18. This brings the flask free of the machine in a position where it can be readily removed by hand or in case large flasks are employed by appropriate machinery.

In order to relieve the sets of wheels 23 and 23' from the strain which ordinarily would be placed upon them in the pressing operation, I have provided the lugs 39 and 40 on the frame-work 4, against which the ends of the strain bar 20 are adapted to abut when the flask is pressed against the platen. This is attained in the following manner, reference being had particularly to Figs. 4 and 5.

The plates 15 and 16 to which are bolted the two-part tracks 17 and 18 respectively are slidably secured to the sides of the frame 4 by means of the studs 41, the holes to receive the studs being of a diameter greater than the diameter of the studs, thus affording a slight vertical play between the plates and the frame work. But a relatively small area of bearing surface is provided between the plates and the frame work in order to reduce friction. The lugs 39 and 40 are provided with recesses 42 in which are mounted springs 43 which take against the plates 15 and 16 and normally hold them in their lowest position. During the pressing operation the pressure exerted on the platen is transmitted to the plates 15 and 16 through the strain bar and wheels, and compresses the springs until the shoes 44 at the ends of the strain bar abut the lugs 39 and 40. This relieves the wheels and tracks of any undue stress. The springs are of sufficient strength to normally raise the plates 15 and 16, the strain bar, platen and the weight of the flask and mold, when the machine is inverted or rolled over, until the strain bar is clear of the lugs 39 and 40, when it will be obvious that the strain bar can be readily rolled along the tracks. The movement of the strain bar away from the center of the machine is limited by the ends of the tracks 17 and 18, and the movement in the other direction is limited by the plates 45, which are bolted to the lugs 39 and 40. The axial movement of the machine is limited in one direction by the curved strap 46, which is bolted in the base plate 1 and against which the cylinder 5 abuts when the parts are in the position indicated in Fig. 3. When the parts are in the reverse or inverted position the frame 4 abuts the curved straps 47 and 48, (see Fig. 1).

Referring now to the valve 37 for controlling the flow of pressure to the air rapper, it will be seen on inspection of Fig. 1, that the valve is normally closed when the piston 6 and press plate 7 are in the lowest position. When the piston 6 is raised on admission of pressure to the cylinder 5 the valve is opened by means of a lever 49 and spring 50 which normally presses the lever down to engage the valve stem 51 and open the valve. The valve remains open until the lever 49 abuts a rod 52 mounted in the cylinder 12. When this occurs the spring 50 is compressed and the valve 37 permitted to close. This occurs when the piston 6 and press plate 7 have been returned to position.

The structure is simple, and compact, is always maintained in proper balanced position, and can be operated with ease and rapidity. By my improved construction free access to the machine is afforded for both placing the flask in position and removing the completed mold, and this feature reduces the liability of damage to the completed mold to a minimum, and also increases the capacity of the machine by reducing the time required for the carrying out of the molding operation. Any undue stress on the carriage mechanism of the platen is obviated and the various parts of the machine are readily accessible and easily removed or replaced in case of breakage. Other advantages will occur to those skilled in the art.

Having thus described my invention and illustrated its use what I claim is new and desire to secure by Letters Patent is the following:—

1. A roll-over molding machine comprising in combination, a support, a frame work trunnioned in the support, a piston mounted in the frame work and adapted to support a mold flask, a platen, a supporting carriage therefor mounted in the frame work and means whereby the carriage may be retracted.

2. A roll-over molding machine comprising in combination, a support, a frame work trunnioned in the support, a piston mounted in the frame work and adapted to support a mold flask, a platen, a supporting carriage therefor mounted in the frame work, means whereby the carriage may be retracted, and means for limiting the movement of the carriage.

3. A roll-over molding machine comprising in combination, a support, a frame-work trunnioned in the support, a piston mounted in the frame-work adapted to support a mold flask, and a platen slidably supported on the frame-work for relative movement with respect thereto.

4. A roll-over molding machine comprising in combination, a support, a frame work trunnioned in the support, a piston carried by the frame work and adapted to support a mold flask, a platen, a pair of tracks mounted on the frame work, and a carriage for the platen mounted on the tracks.

5. A roll-over molding machine comprising in combination, a support, a frame work trunnioned in the support, a piston carried by the frame work and adapted to support a mold flask, a platen, a pair of tracks mounted on the frame work, a support frame for the platen, and wheels on the supporting-frame for the platen adapted to engage the tracks.

6. A roll-over molding machine comprising in combination, a support, a frame work trunnioned in the support, a piston carried by the frame work and adapted to support a mold flask, a platen, a pair of tracks mounted on the frame work, a supporting frame for the platen, wheels on the supporting frame for the platen adapted to engage the tracks, and means whereby the wheels and tracks are relieved of pressure when the flask is raised against the platen.

7. A roll-over molding machine comprising in combination, a support, a frame work trunnioned in the support, a piston carried by the frame work and adapted to support a mold flask, a platen, a pair of tracks yieldingly mounted in the frame work, a carriage for the platen provided with wheels to engage the tracks, and a lug mounted on the frame work against which the platen carriage is adapted to abut when the flask is raised against the platen.

8. A roll-over molding machine comprising in combination, a support, a frame work trunnioned in the support, a piston carried by the frame work and adapted to support a flask, plates yieldingly mounted on the frame work, tracks mounted on plates, a platen, a supporting carriage therefor provided with wheels to engage the tracks, and lugs mounted on the frame work against which the supporting carriage of the platen is adapted to abut when the flask is raised against the platen.

9. A molding machine comprising in combination, a supporting frame work, a piston mounted thereon adapted to support a mold flask, a platen, a carriage therefor yieldingly mounted in the supporting frame work and means for limiting the movement of the carriage.

10. A roll-over molding machine comprising in combination, a support, a frame-work trunnioned in the support, a platen mounted on the frame-work, a support for a flask and pattern, fluid-actuated ramming means mounted in the frame-work for advancing the support to the platen, and fluid-actuated means connected to said support for elevating said support and drawing the pattern, the said platen being adapted to support the flask when the machine is inverted.

11. A roll-over molding machine comprising in combination, a support, a frame-work trunnioned in the support, a platen mounted on the frame-work, a main cylinder mounted on the frame-work provided with a ramming piston, a plate mounted on said piston adapted to support a mold flask and pattern, a supplementary cylinder adjacent the main cylinder provided with a piston connected to said plate, means for admitting fluid pressure into the main cylinder to advance the ramming piston, and means for admitting fluid pressure into the supplementary cylinder to elevate the said plate and draw the pattern after the machine has been inverted.

12. A roll-over molding machine comprising in combination a support, a frame-work trunnioned in the support, a platen mounted on the frame-work, a main cylinder mounted on the frame-work provided with a ramming piston, a plate mounted on said piston adapted to support a mold flask and pattern, supplementary cylinders adjacent the main cylinder provided with pistons connected to the plate, means for admitting fluid pressure into the main cylinder to advance the ramming piston, and means for admitting fluid pressure into the supplementary cylinders to elevate the said plate and draw the pattern after the machine has been inverted.

In testimony whereof, I have hereunto set my hand in the presence of the two subscribing witnesses.

WILLIAM W. DOOLITTLE.

Witnesses:
F. E. McCreary,
Harry McCreary.